(12) United States Patent
Randle

(10) Patent No.: US 7,988,201 B2
(45) Date of Patent: Aug. 2, 2011

(54) FLUID COUPLING ASSEMBLY HAVING A ROTATABLE COUPLING

(75) Inventor: Grant M. Randle, Kensington (AU)

(73) Assignee: GM Global Technology Operations LLC, Detroit, MI (US)

( * ) Notice: Subject to any disclaimer, the term of this patent is extended or adjusted under 35 U.S.C. 154(b) by 753 days.

(21) Appl. No.: 11/746,928

(22) Filed: May 10, 2007

(65) Prior Publication Data

US 2008/0277920 A1 Nov. 13, 2008

(51) Int. Cl.
*F16L 27/093* (2006.01)
*F16L 41/00* (2006.01)
*F16B 43/00* (2006.01)

(52) U.S. Cl. .................................. 285/190; 411/533

(58) Field of Classification Search ............... 285/92, 285/114, 190, 23, 191; 411/533
See application file for complete search history.

(56) References Cited

U.S. PATENT DOCUMENTS

| | | | | |
|---|---|---|---|---|
| 3,777,796 A * | 12/1973 | Takano | | 411/134 |
| 4,333,505 A * | 6/1982 | Jones et al. | | 141/383 |
| 4,672,998 A * | 6/1987 | Kozak, III | | 137/614.04 |
| 4,729,706 A * | 3/1988 | Peterson et al. | | 411/175 |
| 4,955,643 A * | 9/1990 | Bona et al. | | 285/190 |
| 5,362,111 A * | 11/1994 | Harbin | | 285/92 |
| 5,403,041 A * | 4/1995 | Merkel et al. | | 285/4 |
| 5,423,775 A * | 6/1995 | Cannon | | 604/533 |
| 6,007,109 A * | 12/1999 | Schoetz | | 285/190 |
| 6,685,232 B2 * | 2/2004 | Sampson | | 285/190 |
| 7,226,088 B2 * | 6/2007 | Skiba et al. | | 285/92 |
| 2003/0042737 A1* | 3/2003 | Sampson | | 285/190 |
| 2006/0033328 A1* | 2/2006 | Skiba et al. | | 285/92 |

FOREIGN PATENT DOCUMENTS

DE  202005006698 U1  6/2005
EP     0646748 A1     4/1995

* cited by examiner

*Primary Examiner* — James M Hewitt
(74) *Attorney, Agent, or Firm* — Quinn Law Group, PLLC

(57) ABSTRACT

A fluid coupling assembly includes a rotatable fluid coupling and fastener, and a gasket having upper and lower washers interconnected by a deflectable strap. When the strap is laterally deflected, the fastener passes through openings in the coupling with minimal interference. The strap exerts a return force for engaging the washers with the fastener upon release. Tangs on the washers engage the fastener, and one washer forms a seal against a surface. A banjo joint assembly includes a rotatable banjo coupling, the gasket, a gasket with tangs, and a bolt retained to the coupling by the tangs. A method for preparing a fluid coupling assembly for attachment to an external surface includes providing a gasket with deflectable portions, positioning a fluid coupling in the space therebetween, deflecting the portions sufficiently to insert a fastener into the coupling, and retaining the coupling on the fastener when the portions are not deflecting.

7 Claims, 2 Drawing Sheets

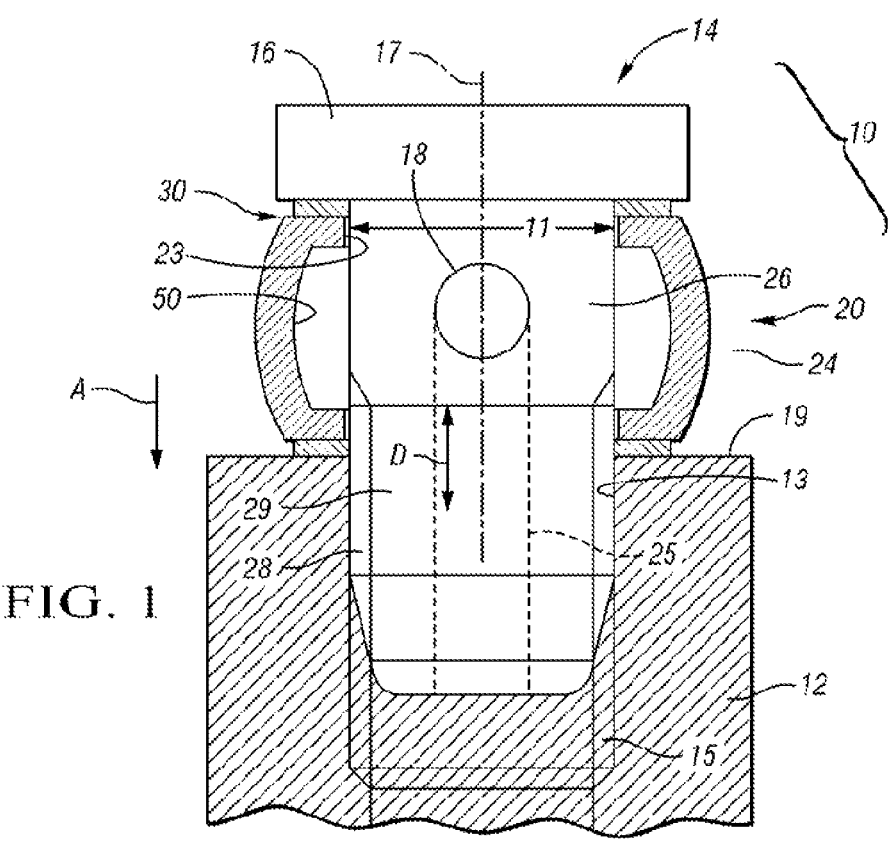
FIG. 1
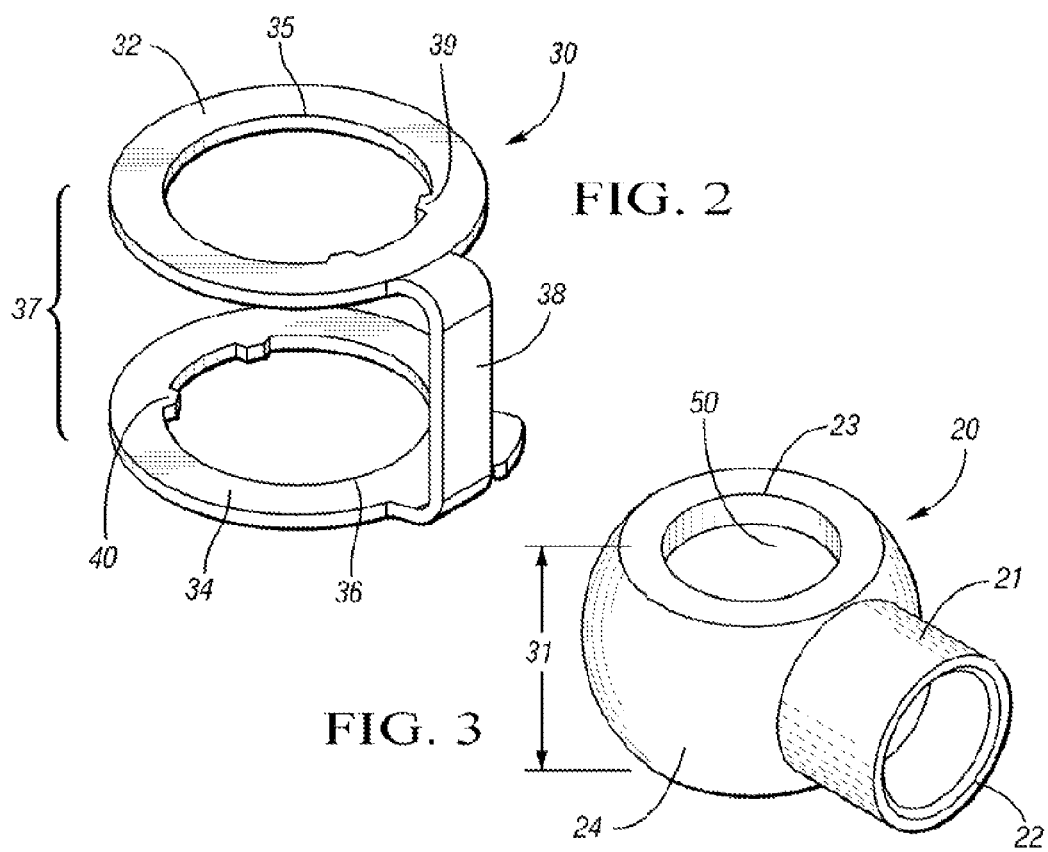
FIG. 2
FIG. 3

FLUID COUPLING ASSEMBLY HAVING A ROTATABLE COUPLING

TECHNICAL FIELD

The present invention relates generally to a fluid coupling assembly, and in particular to a banjo joint assembly having a deflectable gasket for capturing or retaining a threaded fastener with respect to a rotatable banjo coupling.

BACKGROUND OF THE INVENTION

In automotive assemblies, for example oil filtration systems or other systems requiring circulation of a supply of cooling and/or lubricating fluid, special directional pipe unions are used to join or connect various components of the assembly and to redirect the fluid supply, often within a relatively compact space. Such pipe unions typically include a rotatable fluid coupling shaped to conduct fluid through the assembly and to redirect the flow in one or more lateral directions. When such couplings are configured with a rotatable body having a single right angled fluid port, they are commonly referred to as "banjo" unions or banjo couplings due to their banjo-like appearance, and once installed, referred to as banjo joints.

A banjo coupling is typically installed or attached to an external surface using a threaded fastener or bolt to form a banjo joint. The fastener includes a hollow shaft, with the hollow of the shaft forming a fluid channel suitable for conducting fluid through the banjo coupling from the external surface, or from the banjo coupling to the external surface, depending on the application. The shaft is typically formed with one or more lateral side ports or orifices that align with the right-angled fluid port of the banjo coupling, thereby redirecting the fluid through the banjo coupling as needed.

To facilitate assembly, banjo couplings are sometimes paired with a fastener in advance of installation to the external surface, and joined using a retaining clip or other such retaining device to prevent separation of the fastener and banjo coupling during shipping and handling prior to installation. Such clips are commonly designed to provide an interference fit with the threads of the fastener upon insertion of the fastener shaft through the banjo coupling so as to ensure that the clip firmly engages with the threads. However, interference fit designs may be less than optimal due to the sliding contact or friction occurring between the retaining device or clip and the various threads of the fastener as the fastener shaft passes through the retaining device.

SUMMARY OF THE INVENTION

Accordingly, a fluid coupling assembly is provided for retaining or capturing a fluid coupling and a fastener. The assembly includes a rotatable fluid coupling having an axis of rotation and a circular fluid through-channel along the axis; a gasket having a upper and a lower washer each with a circular opening, with the washers interconnected by a deflectable gasket strap; and a threaded fastener having a shaft with a plurality of external threads and a major diameter. When the strap is sufficiently deflected, the fastener shaft is allowed to pass through the fluid through-channel and both circular openings with minimal interference at the major diameter. The deflectable strap exerts or imparts a return force when released that is sufficient for engaging the washers with the fastener, thus capturing the fastener and fluid coupling.

In one aspect of the invention, the upper and lower washers each have a set of tangs that extend radially-inward from the respective circular opening, with the tangs engaging the fastener upon release of the deflectable strap to thereby retain the fastener and the coupling.

In another aspect of the invention, the washers are constructed at least partially of metal and coated with flexible sealing material to form a fluid seal, which is configured to seal against an external surface when the assembly is attached thereto.

In another aspect of the invention, the deflectable strap has a predetermined stiffness, and the upper and lower openings have axially unaligned center points when the strap is in an undeflected state. The distance between the center points and the predetermined stiffness is selected to provide a sufficient return force when in a deflected state for capturing the fastener and coupling.

In another aspect of the invention, the fluid coupling is a banjo joint having at least one radially-extending fluid passage intersecting the fluid through-channel.

In another aspect of the invention, a method of preparing a rotatably positionable fluid coupling subassembly suitable for attachment to an external surface. The method includes providing a retaining gasket having a pair of deflectable and spaced gasket portions, and positioning the coupling in the space therebetween. The portions are sufficiently deflected, and a fastener is inserted into the coupling irrespective of the rotatable position of the coupling, thus retaining the fluid coupling on the fastener when the gasket portions are not deflecting and forming the subassembly.

In another aspect of the invention, the method includes fastening the subassembly to the external surface after preparing the subassembly.

In another aspect of the invention, the method includes forming at least one of the gasket portions a set of tangs, and engaging the tangs with the fastener when the gasket portions are not deflecting.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a side cutaway view of a fluid coupling assembly according to the invention;

FIG. 2 is a perspective side view of a deflectable retaining gasket usable with the assembly shown in FIG. 1;

FIG. 3 is a perspective side view of a banjo coupling usable with the assembly of the invention;

DESCRIPTION OF THE PREFERRED EMBODIMENTS

Figure 4:
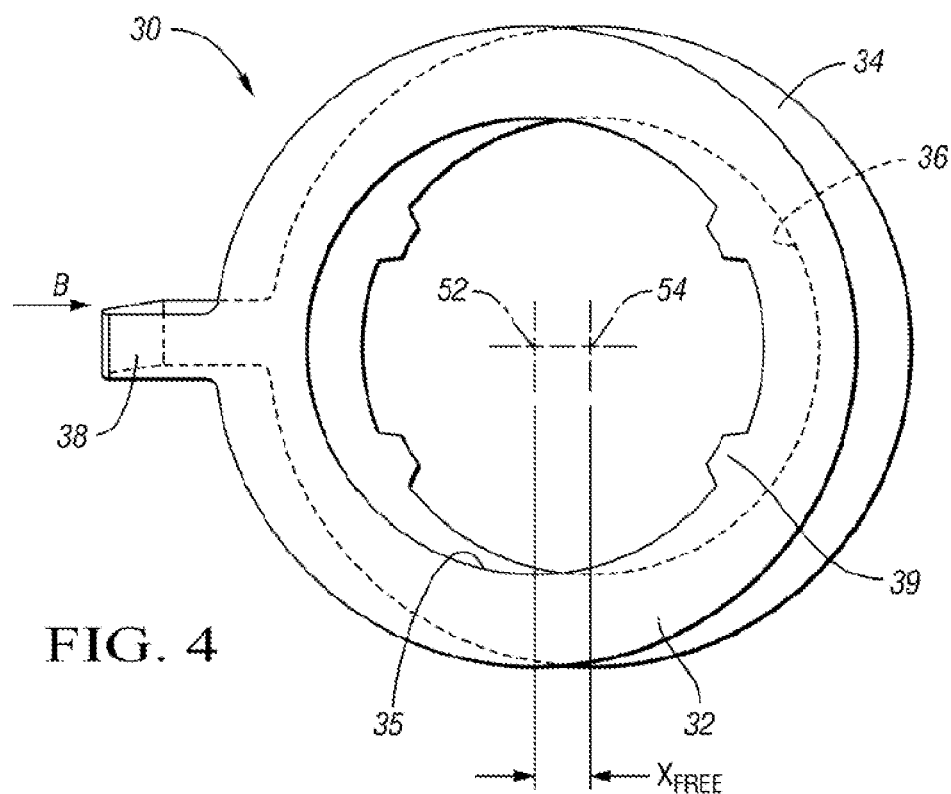
FIG. 4 is a perspective top view of the gasket of FIG. 2 in a free or uninstalled state.

Referring to the drawings wherein like reference numbers correspond to like or similar components throughout the several figures, there is shown in FIG. 1 a cutaway side view of a fluid coupling assembly 10 having a fluid coupling 20, a deflectable gasket 30 (also see FIG. 2), and a fastener 14 having a shaft 29. Assembly 10 is preferably a banjo joint assembly or a similar fluid coupling assembly suitable for conducting, circulating, and/or redirecting high pressure automotive fluids, as will be described in more detail later hereinbelow. When configured as a banjo coupling (see FIG.

3), fluid coupling 20 includes a body 24 forming an internal annulus 50 for circulating high pressure fluid (not shown) within fluid coupling 20, as will be understood by those of ordinary skill in the art. Deflectable gasket 30 is configured to retain, secure, or otherwise capture the fluid coupling 20 and fastener 14 to thereby facilitate installation or attachment of assembly 10 to an external surface 19 of a housing 12, as well as to facilitate shipping, handling, storage, and/or other manufacturing processes by consolidating or pre-coupling a fluid coupling 20 and fastener 14.

Fastener 14 is specially configured to conduct fluid in either axial direction (arrow D) through a primary fluid channel 25 formed axially through the fastener 14 along its axis of rotation 17. Fastener 14 is preferably a threaded bolt, but may also be a threaded screw, rivet, or other similar fastening device having a plurality of externally projecting threads 28 formed along or on an axially-projecting shaft 29. Threads 28 are matable or engagable with a like plurality of internally-projecting threads 15 formed within a receptacle or threaded passage 13 of housing 12 when shaft 29 is threaded into passage 13 in the direction of arrow A. Housing 12 may be, for example, a vehicle component such as an oil filter adapter or other such fluid-containing or fluid-powered engine component. External surface 19 is substantially flat, and lower washer 34 forms a seal thereagainst when properly installed. Therefore, upper and lower washers 32 and 34, respectively, are preferably constructed at least partially of metal and coated with a flexible sealing material, such as fluorocarbon, nitrile, and/or other flexible sealing material suitable for providing a sufficient fluid seal against external surface 19 and fluid coupling 20, as appropriate.

Shaft 29 preferably includes a bore section 26 having a major outer diameter 11, with bore section 26 being a smooth surface, i.e. without external threads 28. Fastener 14 terminates or ends at a fastener head 16 adjacent to bore section 26, with head 16 being suitably shaped or formed to receive an applied external torque sufficient for tightening fastener 14, such as a preferred hex head. Preferably, fastener 14 includes at least one radially-extending secondary fluid passage 18 formed in bore section 26 and intersecting primary fluid passage 25 at axis 17 inside of shaft 29. Secondary fluid passage 18 preferably intersects primary fluid passage 25 at a right angle when fastener 14 is used to secure a matching right-angled fluid coupling 20 (see FIG. 3), such as a banjo coupling, as will be described in detail hereinbelow.

Turning to FIG. 2, deflectable gasket 30 is a unitary component that includes an upper gasket portion or washer 32, a substantially identical lower gasket portion or washer 34, and a deflectable connecting member or gasket strap 38. Upper washer 32 has circular or annular opening 35 through the thickness of upper washer 32, with annular opening 35 referred to hereinafter for clarity as upper opening 35. Likewise, lower washer 34 has a substantially identical circular or annular opening 36 passing through the thickness of lower washer 34, with annular opening 36 referred to hereinafter for clarity as lower opening 36. Upper and lower washers 32 and 34, respectively, are separated by a gap or space 37 and joined or interconnected by the deflectable connecting member or gasket strap 38. Washers 32 and 34 further include a plurality of radially inwardly-projecting teeth, splines, or tangs 39 and 40, respectively, with each plurality of tangs 39 and 40 being configured to engage with a different portion of fastener 14 in the manner described later hereinbelow.

Turning to FIG. 3, fluid coupling 20 is shown as a preferred banjo coupling, as previously described hereinabove, and will be referred to hereinafter for clarity as banjo coupling 20. Banjo coupling 20 is constructed of a suitable grade of plastic or metal, and has a preferably circular main portion or body 24, from which extends or projects an extension or arm 21 containing a radially-extending fluid passage 22 therein. Arm 21 is configured to allow high-pressure hose or tubing (not shown) to be clamped or otherwise securely attached thereto. A primary through-channel 23 is formed axially through body 24 along axis 17 (see FIG. 1), with primary through-channel 23 preferably formed without threads or any other internal obstructions to thereby enable body 24 to rotate freely as needed in order to facilitate installation, for example into a crowded engine compartment (not shown). Through-channel 23 opens or widens into annulus 50 (also see FIG. 1) within body 24 to allow fluid (not shown) to flow or circulate within banjo coupling 20, as described previously hereinabove. Body 24 has a height 31 that fits or passes, preferably without interference, into space 37 of deflectable gasket 30 (see FIG. 2), allowing body 24 to be easily inserted between washers 32 and 34 (see FIG. 2) during assembly.

Turning to FIG. 4, deflectable gasket 30 is shown in top perspective view in an undeflected or "free" state, with upper washer 32 positioned above lower washer 34, and deflectable gasket strap 38 positioned on the left hand side in the figure. Annular opening 35 of upper washer 32 has a center point 52, and likewise, annular opening 36 of lower washer 34 has a center point 54, with each of center points 52 and 54 on a different axis, i.e. with washers 32 and 34 not coaxially aligned, i.e., coaxially unaligned. The distance between center points 52 and 54 in the free state is labeled "$X_{FREE}$" in FIG. 4.

In accordance with the invention, a sufficient deflection force (arrow B) is laterally applied as shown to upper washer 32 and/or deflectable strap 38 so as to laterally move upper washer 32 and thereby substantially align center point 52 of upper washer 32 with center point 54 of lower washer 34, allowing an insertion of shaft 29 of fastener 14 (see FIG. 1) into circular openings 35 and 36. Insertion of fastener 14 is possible irrespective of the rotatable position of coupling 20 (see FIG. 3), due to the uniform nature of primary through-channel 23. More specifically, deflectable gasket strap 38 is laterally deflected or moved to the degree necessary to allow major outer diameter 11 of fastener 14 (see FIG. 1) to pass through both of upper and lower washers 33, 34, respectively, and through primary through-channel 23 of banjo coupling 20 (see FIG. 3), without interference at major outer diameter 11.

Alternately, fastener 14 may itself provide the contact force necessary to substantially align center points 52 and 54 as described hereinabove, such that the fastener 14 is allowed to pass through upper and lower washers 32 and 34, respectively, without damaging the threads 28. If deflection is provided by contact with fastener 14, some interference will necessarily result between threads 28 and washers 32 and 34. Therefore, deflectable gasket 30 may be designed or configured such that the contact force between washers 32, 34 and threads 28 is thereby minimized or eliminated, thus minimizing any risk of damage to threads 28.

Figure 5:
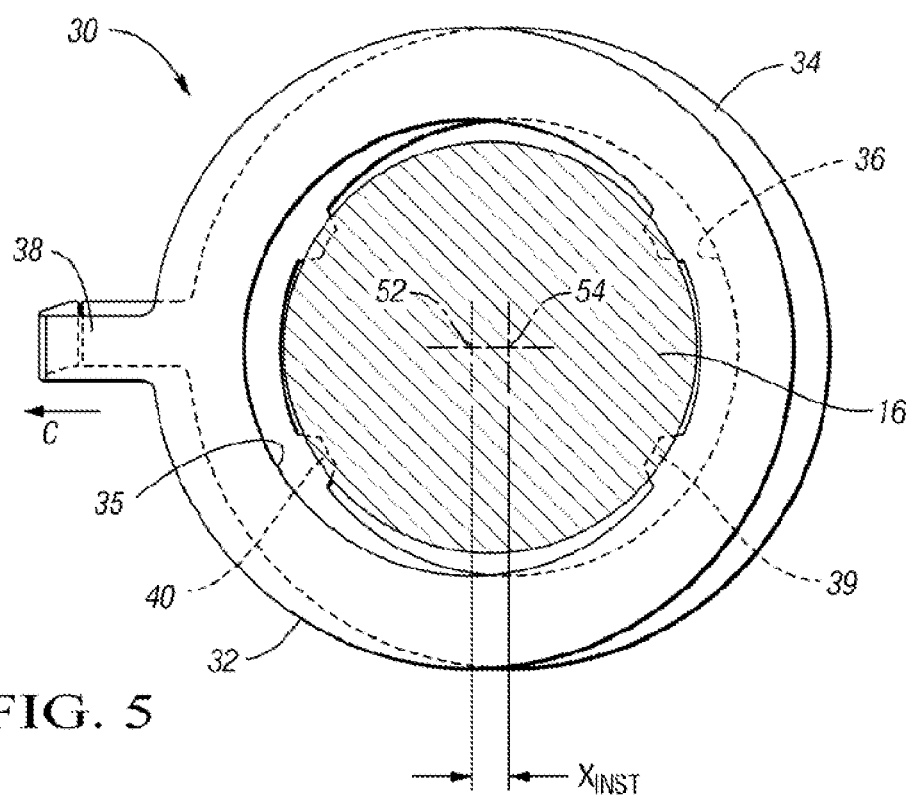
FIG. 5 is a perspective top view of the gasket of FIGS. 2 and 4 in an installed state.

Turning to FIG. 5, deflectable gasket 30 is shown in a partially deflected or "installed" state after fastener 14 has been captured. The installed state is labeled as "$X_{INST}$" in FIG. 5. Upon insertion of the shaft 29 of fastener 14, as discussed hereinabove, and upon subsequent release of the deflection force (arrow B of FIG. 4), the spring force or return force (arrow C) exhibited or provided by deflectable gasket strap 38 moves or forces washers 32 and 34 out of alignment, and back toward the original free state ($X_{FREE}$) shown in FIG. 4. Once released, the return force (arrow C) continues to move or force the washers 32, 34 into engagement with fastener 14 before reaching a fully undeflected state, thus capturing fastener 14. Specifically, upper tangs 39 are preferably configured and/or sized to engage with or press on bore section 26 of fastener 14, while lower tangs 40 are likewise configured to engage at least one of the plurality of threads 28. To enable engagement of lower tangs 40 with one or more of the plurality of threads 28, lower tangs 40 may be configured differently than upper tangs 39, for example by extending or elongating lower tangs 40 a sufficient distance to ensure engagement with threads 28.

As shown in FIG. 1, banjo coupling 20 is also captured indirectly by deflectable gasket 30 due to the placement or position of shaft 29 within primary through-channel 23 (see FIG. 3). In other words, fastener 14 is inserted into through-channel 23 of banjo coupling 20, which in turn is captured or secured by deflectable gasket 30 as described hereinabove, thus ensuring that fluid coupling assembly 10 (see FIG. 1) remains intact as an assembly during all phases of shipping and assembly, thus optimizing the manufacturing process.

While the best modes for carrying out the invention have been described in detail, those familiar with the art to which this invention relates will recognize various alternative designs and embodiments for practicing the invention within the scope of the appended claims.

The invention claimed is:

1. A fluid coupling assembly for attachment to a housing, comprising:
   a rotatable fluid coupling having an axis of rotation and a through-channel along said axis;
   a gasket having installed state and a free or an uninstalled state, an upper washer with an annular first opening formed therethrough, and a lower washer with an annular second opening formed therethrough, wherein:
      said upper washer and said lower washer each have respective centerpoints that are coaxially unaligned with respect to each other when the gasket is in each of the uninstalled and the installed states, wherein the distance between the centerpoints in the installed state is less than the distance between the centerpoints in the uninstalled state; and
      each of the upper washer and the lower washer includes radially-inwardly projecting tangs, wherein the upper and the lower washers are interconnected on one side by a deflectable gasket strap which exerts a biasing return force; and
   a threaded fastener having a shaft with a plurality of external threads, wherein the installed state is a state in which the fastener is captured by the gasket prior to attachment of the fluid coupling assembly to the housing;
   wherein the biasing return force engages the tangs of each of said upper washer and said lower washer with said threads of the fastener in the installed state to thereby retain said fastener to said fluid coupling.

2. The assembly of claim 1, wherein at least one of said upper washer and said lower washer is constructed at least partially of metal and is coated with a flexible sealing material for sealing against an external surface when said assembly is attached to said external surface.

3. The assembly of claim 1, said strap having a predetermined stiffness, wherein said different centerpoints and said predetermined stiffness are sufficient to exert a sufficient amount of said biasing return force for retaining said fastener to said fluid coupling via engagement of the tangs with the external threads of the fastener.

4. The assembly of claim 1, wherein said fluid coupling is a banjo joint having at least one radially-extending fluid passage intersecting said through-channel.

5. A fluid coupling assembly for attachment to a housing, comprising:
   a rotatable banjo coupling having an axis of rotation and an unthreaded through-channel formed along said axis;
   a gasket having an installed and a free or uninstalled state, an upper washer with an annular upper opening formed therethrough, and a lower washer with an annular lower opening formed therethrough, wherein:
      said upper washer and said lower washer each have respective centerpoints that are coaxially unaligned with respect to each other in the uninstalled and the installed states, wherein the distance between the centerpoints in the installed state is less than the distance between the centerpoints in the uninstalled state;
      the upper and lower washers are interconnected on one side by a deflectable gasket strap which exerts a biasing return force; and
      each of said upper opening and said lower opening having a pair of radially-inward projecting tangs; and
   a threaded bolt having a shaft with a plurality of external threads, wherein the installed state is a state in which the bolt is captured by the gasket at the threads prior to attachment of the fluid coupling assembly to the housing;
   wherein said biasing return force moves said tangs of each of said upper and lower washers into engagement with said threads when said gasket is in said installed state, thereby capturing said rotatable banjo coupling between said washers and securing said gasket to said bolt.

6. The assembly of claim 5, wherein at least one of said upper washer and said lower washer is constructed at least partially of metal and is coated with a flexible sealing material to form a fluid seal suitable for sealing said lower washer against an external surface.

7. The assembly of claim 5, said strap has a predetermined stiffness, and wherein said different centerpoints and said predetermined stiffness are sufficient to exert a sufficient amount of said biasing return force for engagement of the tangs with the threads of the bolt.

* * * * *